Feb. 6, 1940.　　　　B. A. EVANS　　　　2,189,243
AUTOMATIC OVERHEAD PROOFER
Filed Feb. 23, 1938　　　5 Sheets-Sheet 1
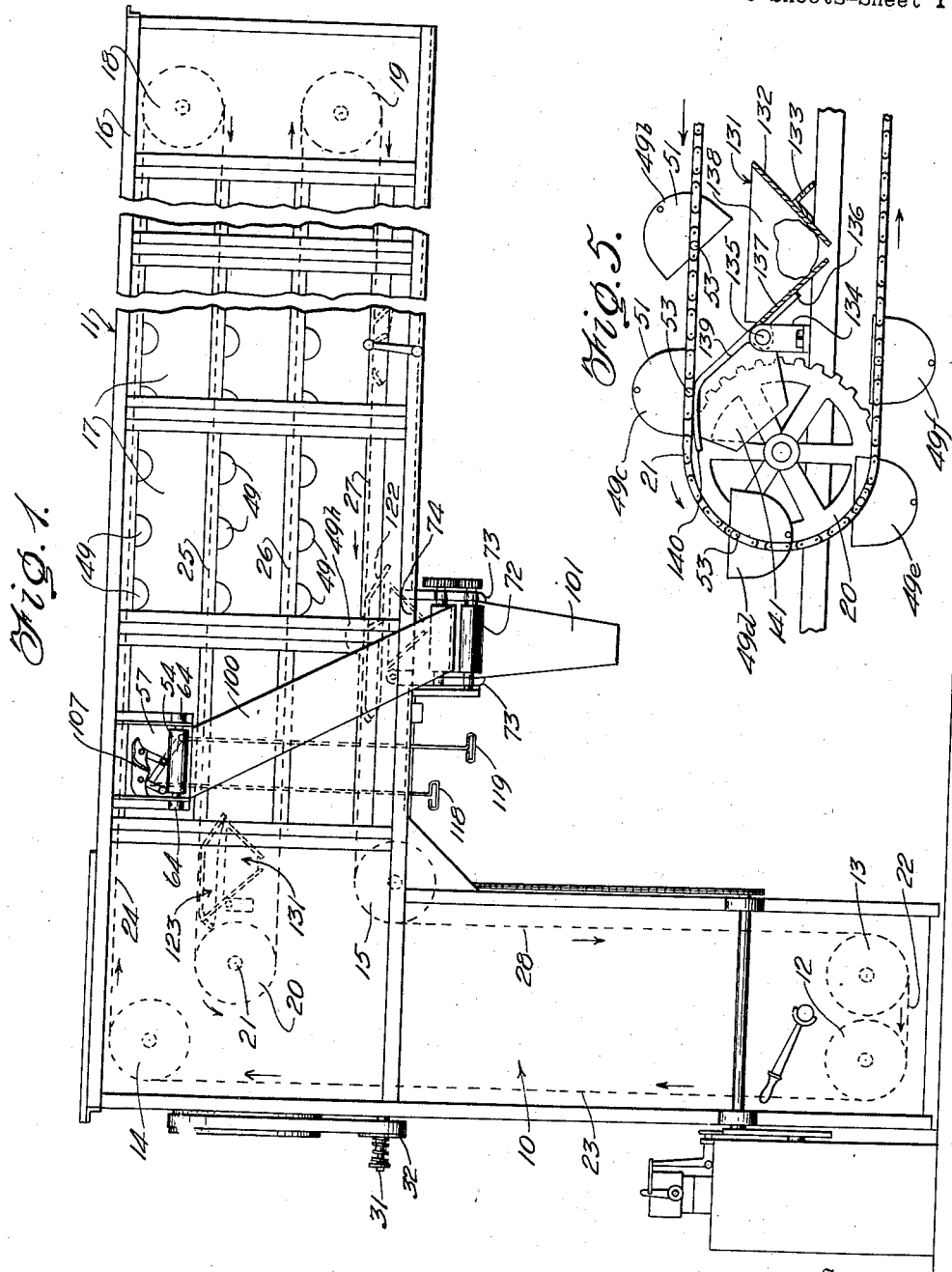
Inventor
BERNARD A. EVANS,
Attorney Feb. 6, 1940.	B. A. EVANS	2,189,243
AUTOMATIC OVERHEAD PROOFER
Filed Feb. 23, 1938	5 Sheets-Sheet 2
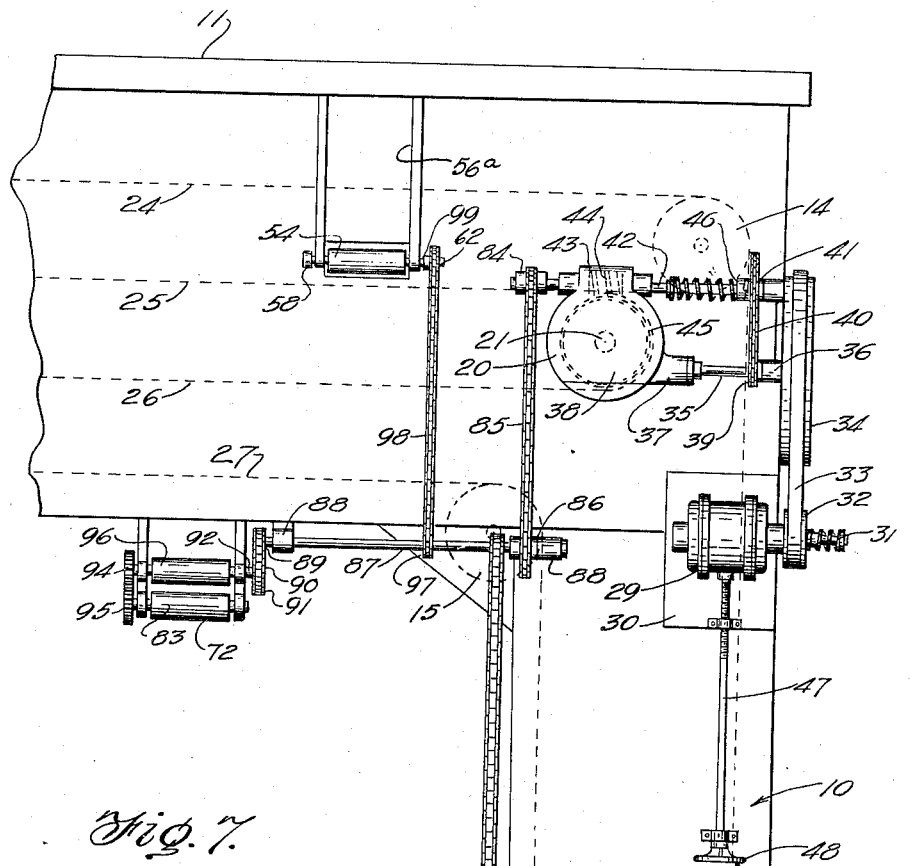
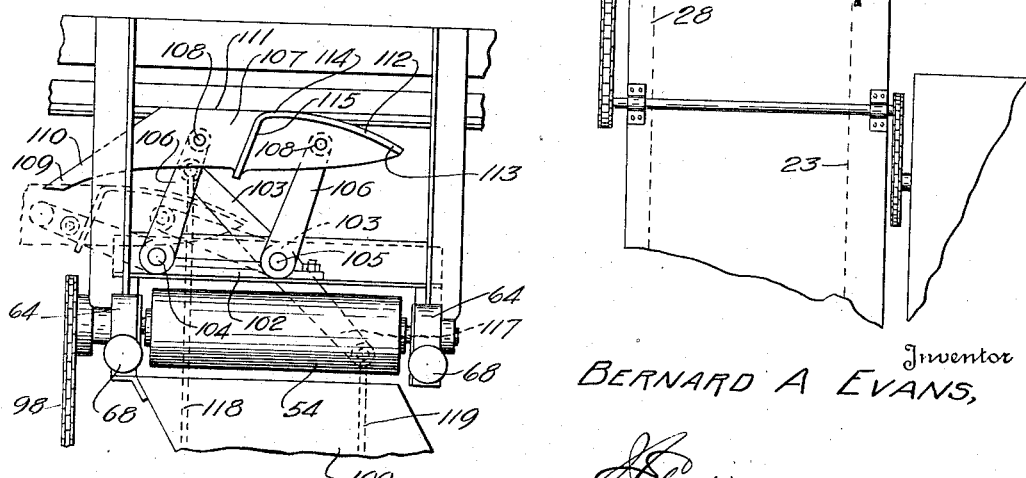
Inventor
BERNARD A. EVANS,
Attorney

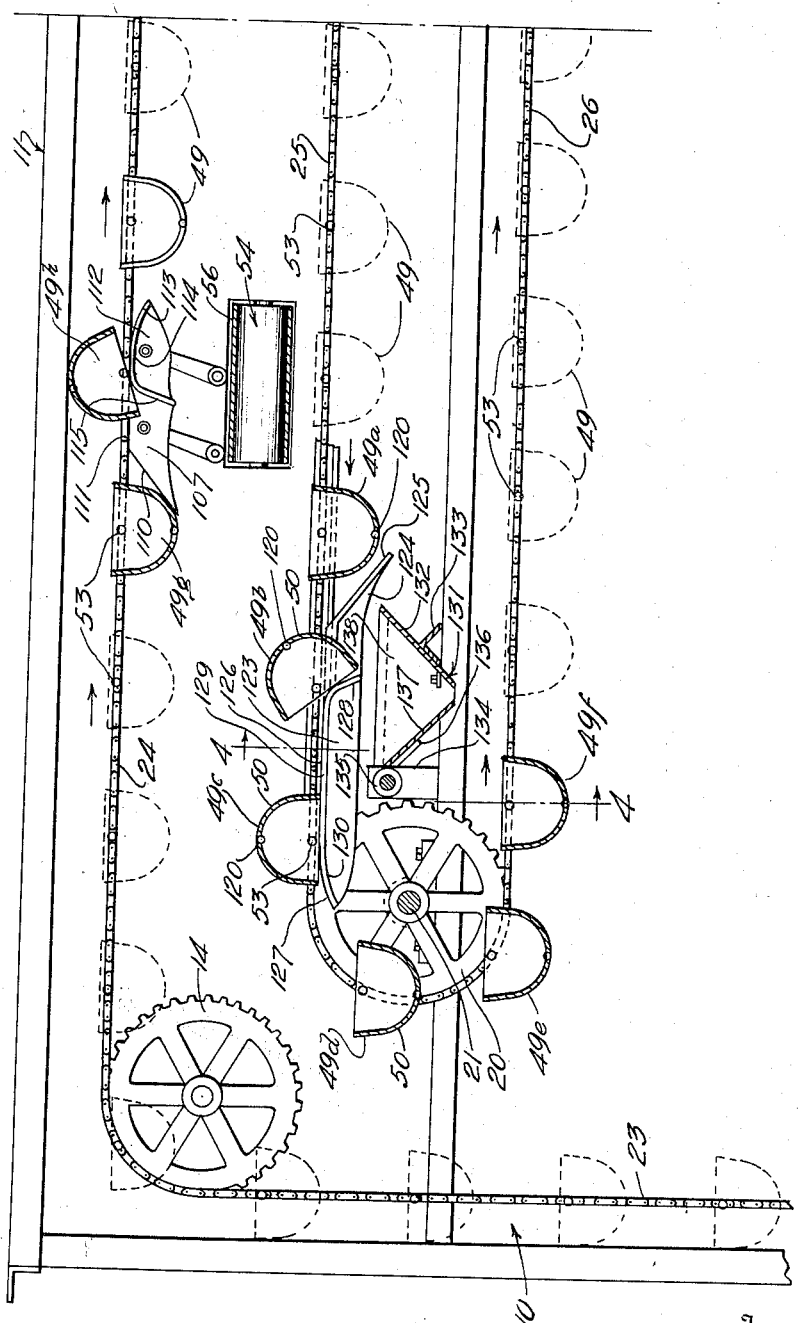

Feb. 6, 1940.  B. A. EVANS  2,189,243
AUTOMATIC OVERHEAD PROOFER
Filed Feb. 23, 1938  5 Sheets-Sheet 4

Inventor
BERNARD A. EVANS,

By [signature]

Attorney

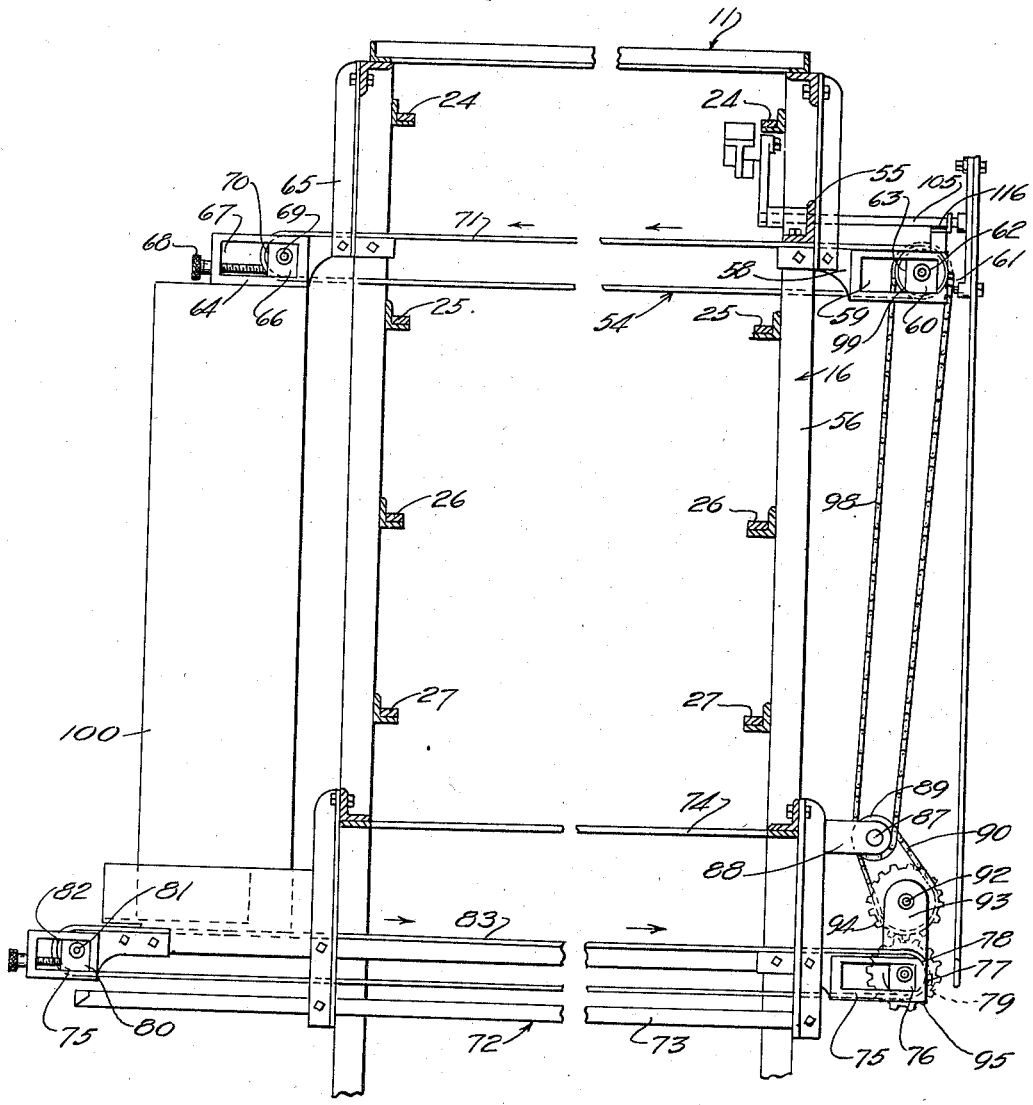

Patented Feb. 6, 1940

2,189,243

UNITED STATES PATENT OFFICE 2,189,243

AUTOMATIC OVERHEAD PROOFER

Bernard A. Evans, Joliet, Ill., assignor to Champion Machinery Company, Joliet, Ill.

Application February 23, 1938, Serial No. 192,159

16 Claims. (Cl. 198—145)

This invention relates to bakery equipment and particularly to a proofer, the invention being preferably known as an automatic overhead proofer.

There are certain general types of dough that may be subjected to proofing in such a proofer. For instance such proofers may be used in bake shops for ordinary type doughs such as are made by the sponge method or that made by what is termed the straight dough method.

There is, however, a type of dough made in bakeries called the dough brake dough. In the manufacture of bread from a regular or ordinary type of dough the process starts with mixing the ingredients. After the dough is mixed it is fed to a suitable dividing machine which effects the division of the mass of dough into portions suitable for forming loaves or the like. The dough is then fed in its divided state through a rounder which shapes the divided portions into proper loaf form for proofing. From the rounder the dough passes to the proofer. For the ordinary types of dough the loaf stays in the proofer for a certain number of minutes to allow it to "proof", the time being all the way from five to fifteen minutes, according to the local atmospheric conditions and the type of dough under manufacture. From the proofer the proofed loaf is discharged into a suitable moulder for further treatment of the loaf.

For making the dough brake type of loaf, which has entirely different characteristics from the regular type of bread, practically no intermediate proofing is necessary before it enters the moulder.

In either the treatment of ordinary types of dough or in the treatment of dough brake dough it is desirable to so arrange the machinery that the same divider, rounder and moulder may be used. It is, of course, impracticable to rearrange the machinery of a bakery in changing from one type of dough to another. As stated above, the dough passes from the rounder to the proofer and then to the moulder. Since it is not desirable that the dough pass through the proofer in treating the dough brake type of dough, the passage of dough through the proofer must, as far as possible, be eliminated.

One object of the present invention is, therefore, to provide a novel by-pass arrangement for causing the dough to be discharged from the proofer to the moulder shortly after it has entered such proofer.

A second object of the invention is to so arrange the novel by-pass arrangement that it may be brought into and out of effective by-passing relation with the proofer at the will of the operator.

It is also desirable in treating certain doughs of other than the dough brake type that the proofing time should be short and when this is the case the novel by-pass arrangement is available for shortening the proofing time.

In bakery practice, after the dough is scaled in the divider to the weight of the loaf and rounded it is given a certain rest period or proofing of between five to fifteen minutes according to conditions of the dough. However, it has been found in actual practice that if this dough remains in one position in a tray it will have a tendency to crust on the top side and sweat on the under side. To further improve the product it is found absolutely necessary that the dough be turned once in its travel through the proofer in order that air may have access to all sides of the dough ad thus eliminate crusting and sweating in such doughs as require proofing. A third important object of the invention is to provide a novel loaf inverting mechanism in a proofer for effecting such turning of the dough masses, the mechanism being, from certain characteristics of its construction, preferably known as a delayed shelf type loaf inverting mechanism.

A fourth important object of the invention is to provide a novel type of loaf inverting mechanism of such character that the mechanism tends to elongate the dough loaf as it is inverted.

A fifth important object of the invention is to provide a novel loaf inverting mechanism having guide means for the dough pieces to ensure correct spacing thereof.

A sixth important object of the invention is to provide a novel proofer arrangement having the regular discharge from the proofer effected by the same type of mechanism as is employed to invert the loaves.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a baker's proofer wherein the mechanisms relating to the present invention are embodied.

Figure 2 is an enlarged fragmentary view of a portion of the proofer from the side opposite that shown in Figure 1, the view showing particularly the driving arrangements connecting the motor used herewith to the several moving parts of the apparatus.

Figure 3 is an enlarged fragmentary longitudinal section disclosing certain tray inverting mechanisms used in this invention.

Figure 5 is a side elevation of certain of the elements shown in Figures 3 and 4, the view being taken from the left of Figure 4 and the parts being shown on the same scale as Figure 3.

Figure 6 is an enlarged transverse section through the horizontal portion of the proofer, the view showing the arrangement of certain transverse conveyors used herein and much of the mechanism being omitted to more clearly bring out the parts shown.

Figure 7 is an enlarged detail view of a portion of the front wall of the proofer.

Figure 4:
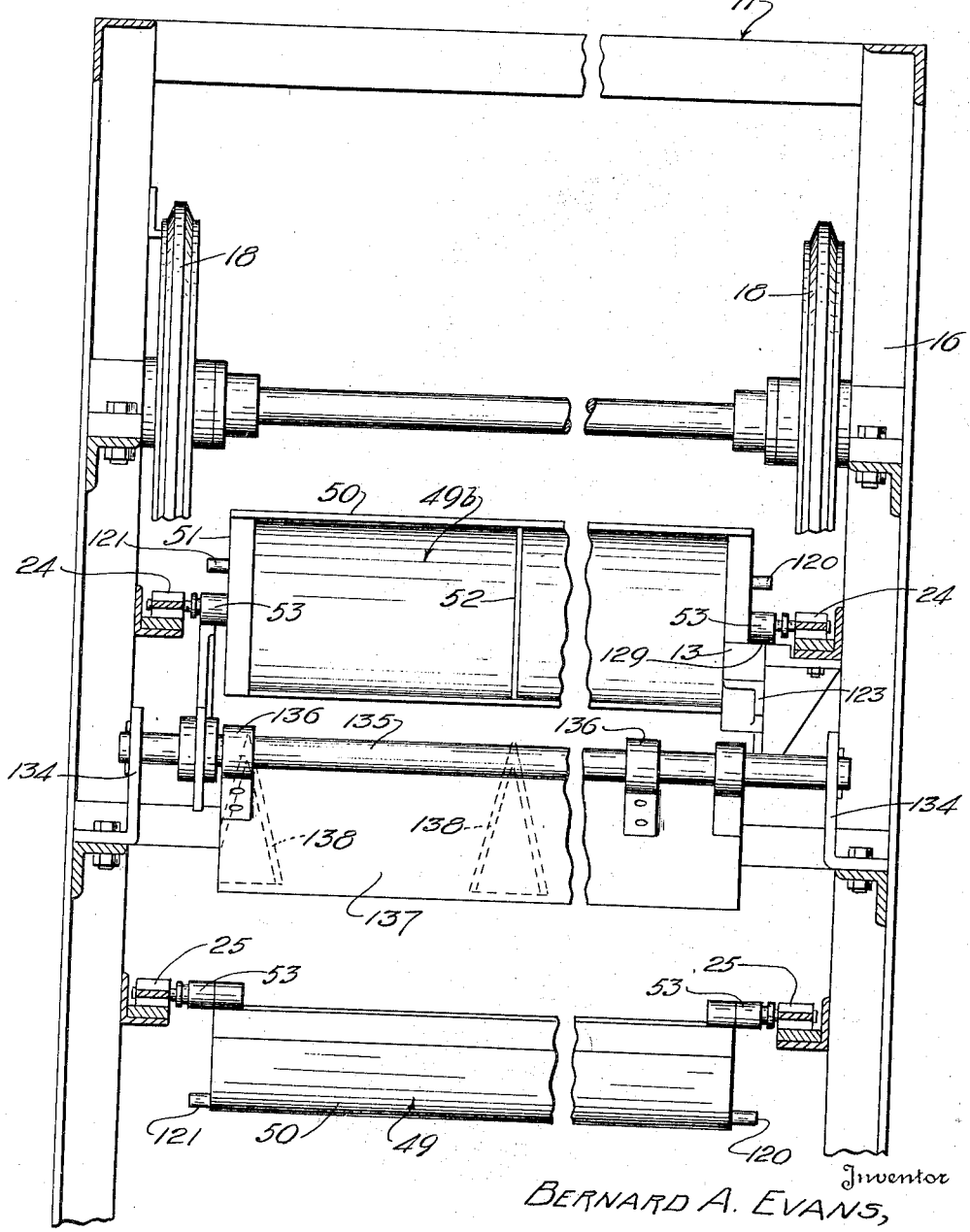
Figure 4 is a still more enlarged fragmentary section on the line 4—4 of Figure 3, certain of the parts cut by the section plane being shown in elevation and certain parts being broken away.

It is to be understood that certain instrumentalities are used in connection with this invention but which form no part of the invention itself. Some of these features are shown in outline but not in detail and these with others not so shown will be referred to hereinafter in order that the operation and advantages of the invention may be clearly comprehended.

It will be seen from Figure 1 that the proofer structure includes a vertical leg 10 from one side of the upper part of which extends a horizontal leg 11. For convenience in the following description the leg 10 will be referred to as the elevator leg and the leg 11 will be termed the proofer leg since the proofing of the dough is principally effected in the leg 11, the dough travelling in the leg 10 for only a minor time. The leg 10 forms a vertical rectangular casing and in the lower end of this casing at the front and rear sides thereof are pairs of idlers for the chains of a chain conveyor used in the proofer. The idlers are positioned as at 12 and 13 so as to have their shafts (not shown) in spaced parallel relation close to the top of the leg 10 and directly above the idlers 12 are idlers 14. At the junction of the lower part of the leg 11 with the leg 10 is a pair of idlers 15.

The leg 11 is in the form of an elongated rectangular casing having a frame 16 in the sides of which are mounted glazed access doors 17. At the end of the leg 11 remote from the leg 10 this casing is shown without doors and in this end of the casing is mounted a pair of upper idlers 18 directly below which is a pair of lower idlers 19. A pair of drive sprockets 20 are located just above the center of the leg 11 in the upper end of the leg 10 and these drive sprockets are fixed on a shaft 21 extending transversely of the casing. Conveyor chains are trained around these drive sprockets and idlers so that each is provided with a bottom horizontal stretch 22 between idlers 12 and 13, an ascending stretch 23 between idlers 12 and 14, an upper outward stretch between idlers 14 and 18, an upper inward stretch 25 between idler 18 and drive sprocket 20, a lower outward stretch 26 between drive sprocket 20 and idler 19, a lower inward stretch between idler 19 and idler 15, and a descending stretch 28 between idlers 18 and 13. It will be seen that the stretches 24, 25, 26 and 27 are parallel. The conveyor chains thus move in the direction of the arrows on Figure 1. In such Figures as 1 and 2 these chains and the wheels carrying them are shown in diagram to avoid confusion of parts.

In order to drive the shaft 21 there is provided a motor 29 mounted for vertical sliding movement on a base 30 fixed to the leg 10. This motor is provided with a shaft 31 whereon is mounted a variable speed pulley 32 preferably of the type known as a Reeves variable speed pulley. This pulley is connected by a belt 33 to a pulley 34 which is mounted on a shaft 35 journalled in a bearing 36 fixed to the leg 10 and in a bearing 37 forming part of a housing 38 for a worm and worm gear drive. On the shaft 35 is fixed a sprocket 39 which is connected by a chain 40 with a sprocket 41 revolubly mounted on a worm shaft 42 leading through the worm casing 43 and carrying the worm 44 which meshes with the worm wheel 45 fixed on the shaft 21 which extends into the casing 38. Preferably the sprocket 41 is connected to the shaft 42 by a safety clutch 46. The motor 29 has its position on the base by the adjusting screw 47 and hand wheel 48 so that the adjustment of pulley 32 may be made by the adjustment of the motor.

The conveyor chains carry certain dough trays which are generically indicated by the numeral 49, the trays in certain positions being indicated by 49 with a literal suffix as will be presently explained. Each of these trays consists of a trough shaped body 50 having closed ends 51 and provided with transverse partitions 52. At each end of each tray there is provided, at the center of the upper edge of said end, a pivot connection or hanger 53 which connects the tray with the adjacent chain. By means of this connection the trays 49 normally depend below the chains but may be swung freely about their pivots so that they may be inverted to discharge their contents.

Extending transversely of the housing 11 adjacent the housing 10 is an upper transverse conveyor or by-passing conveyor which is indicated in general at 54, and shown in detail in Figure 6. As there shown the frame 16 has an angle 55 extending between two upright members 56 of the frame 16, the members 56 being here shown as at the rear of the casing. This angle 55 forms the upper edge of a rear opening 56a through which the rear end of the conveyor 54 passes. At the front of the casing there is also provided an opening 57 through which the forward end of the conveyor 54 passes. (See Figure 1). Brackets 58 are secured to the frame 16 at each side of the opening 56a. One only of these brackets being shown. Each bracket 58 is provided with a bearing slot 59 wherein is mounted a bearing 60 held in the outer end of its slot by suitable means such as the bolt 61. The bearings 60 have a shaft 62 journalled therein and on this shaft is fixed a roller 63. A similar pair of brackets 64 are carried by vertical frame members 65 at each side of the opening 57. In the brackets 64 are mounted adjustable bearing blocks 66 the positions of each of which in slots 67 is controlled by an adjusting screw 68. The bearings 66 support a shaft 69 carrying a roller 70. Around the rollers 63 and 70 is trained a belt 71.

A lower transverse conveyor is indicated in general at 72 and is best shown in detail in Figure 6. In the construction of the conveyor 72 there is provided a pair of side frames 73 depending below the floor of the leg 11 at opposite sides of an opening 74 extending transversely of the floor. These frames project a considerable distance in front of the casing and also project somewhat to the rear of said casing and at each end of these frames there is fixed a pair of brackets 75 of the same character as the brackets 58 and 64. Bearings 76 in the rear brackets 75 are fixed in the brackets as by a bolt 77 and support a shaft 78 carrying a roller 79. Adjustable bearings 80 in the front brackets support a shaft 81 whereon is a roller 82. A belt 83 is trained around the rollers 79 and 82.

These conveyors are driven in the following manner. (Figures 2 and 6.) The worm shaft 42 extends through the worm housing and carries a sprocket 84 which is connected by a chain 85 with a sprocket 86 mounted on a jack shaft 87. The shaft 87 is journalled in bearings 88 projecting rearwardly from the leg 11. On the shaft 87 is fixed a sprocket 89 which is connected by a chain 90 to a sprocket 91 fixed on a shaft 92 which is supported by brackets 93 carried by the frames 73. On the shaft 92 is fixed a gear 94 which meshes with a gear 95 fixed on the shaft 78. On the shaft 92 is fixed a roller 96 which is spaced above the belt 83. Also on the shaft 87 is fixed a sprocket 97 which is connected by a chain 98 with a sprocket 99 fixed on the shaft 62.

The driving connection just described causes the two transverse conveyors to move in the directions indicated by the arrows in Figure 6. Thus material delivered to the conveyor 54 travels forwardly through the opening 57. Leading diagonally downward from a point just below the forward end of the conveyor 54 is a chute 100 which terminates at its lower end just above the forward end of the conveyor 72. Due to this arrangement material delivered from the conveyor 54 will pass down the chute 100 and be deposited on the conveyor 72 which will carry it to the rear of the proofer where it is received in a discharge chute 101 which preferably leads downwardly to a suitable moulder (not shown).

Supported on the frame member 55 is a bracket 102 including a pair of bearings 103 wherein are journalled a short shaft 104 and a long shaft 105. On these shafts is carried a pair of parallel rock arms 106, the arm 106 on the shaft 105 being fixed to this shaft to rotate therewith. The arms 106 extend upward from the bearings 103 and carry at their upper ends a tray inverting member indicated in general at 107. The arms 106 are equal in length and are pivotally connected to the member 107 as at 108. The member 107 includes a body portion having a forward end 109 provided with an inclined upper face 110 extending upward and rearwardly from the extremity of the end 109. At its rear end this face 110 merges into a horizontal upper face 111 extending along the middle of the body and merging rearwardly into a downwardly curving rear face 112. Projecting from the member 107 towards the horizontal median plane of the leg 11 is a flange which has a rear portion 113 and a middle portion 114 having upper surfaces conforming to the edge portions 112 and 111 of the body. From the forward end of the flange portion 114 the flange merges by a curve into a steeply inclined portion 115 extending downwardly and forwardly at about the middle of the body of member 107 so that the flange portion 115 is spaced considerably to the rear of the inclined face 110 of the body. The shaft 105 extends rearwardly to the outside of the casing and has its rear end supported from the brackets 58 as at 116. On the rear end of this shaft is fixed the center of a two armed lever 117 having pull rods 118 and 119 depending from respective ends of the lever. From Figures 1 and 7 it will be seen that pulling downwardly on the rod 118 will rock the shaft 105 in a counter-clockwise direction and cause the member 107 to be depressed to the dotted line or inactive position shown in Figure 7. If the member 107 is in its inactive position and it be desired to render it active the pull rod 119 is pulled downwardly which rocks the shaft 105 in a clockwise direction and thus causes the member 107 to assume the full line or active position of Figure 7.

Each of the trays 49 is provided at its rear end with a pin 120 and at its front end with a pin 121. These pins are aligned and are positioned close to the periphery of the curved portion of the trough-like body of the tray and at the center of such curved portion so that the pins are normally aligned vertically below the pivots 53. The member 107, when raised, is positioned so that the rear ends of the trays pass close to the front side of the body of member 107 so that the member 107 will have its body in the path of the pins 120 and the flange in the path of the rear ends of the trays.

As a result of this construction when the member 107 is in its raised or active position and the main conveyor in motion each tray will move past the member 107. As it does this the pin 120 will engage the lower part of the surface 110. This may be seen at 49g in Figure 3. As the conveyor chains move along the bottom of tray will be retarded and moved upwardly until it has been rotated in a clockwise direction 90° and the pin moves onto the face 111. At this time the tray will lie on its side with one-half of its body projecting downwardly below the chain and its remaining half extending upwardly above the chain. The end portion of the downwardly extending half of the tray will now engage the flange portion 115 and effect further inverting movement of the tray until it is completely inverted as shown at 49h in Figure 3. As the tray is thus inverted the dough therein is dumped onto the conveyor 54. Further movement of the conveyor moves the tray along past the curved face 112 and curved flange 113 so that it continues to turn in a clockwise direction and drops by gravity into its normal depending position. The extent of movement of the member 107 is such that in the dotted line position of Figure 7 it will lie below the path of the trays and thus, when the member 107 is depressed, the trays will pass the conveyor 54 without being dumped. A somewhat similar tray inverting and dumping mechanism 122 is positioned below the lower run 27 of the conveyor and in such relation to the conveyor 72 that inversion and dumping of the trays at this point will discharge the dough onto conveyor 72.

From the foregoing it will be seen that by moving the member 107 to inactive position the dough will travel though the path taken by the several horizontal runs 24, 25, 26 and 27 to conveyor 72 thus receiving full proofing according to the time set by regulating the speed of conveyor travel by the variable pulley or by the use, if desired, of a suitable variable speed motor. It will also be seen that if the member 107 be raised to active position the dough will be dumped practically as soon as it enters the proofing chamber proper as formed by the leg 11 and will be by-passed by way of the conveyor 54, chute 100 and conveyor 72 to the discharge chute 101. Thus, without any rearrangement of the several machines constituting the dough handling line, the dough may be proofed or not as the bakery operative may desire.

There will now be described what is preferably known as the delayed shelf loaf inverting mechanism. This mechanism is here shown as arranged about midway of the path of the dough through the leg 11 but may be positioned wherever desired. As shown in Figures 3 and 5 a tray inverting and dumping member 123 is positioned between the stretches 25 and 26 of the main conveyor and adjacent the drive wheels 20. Since the loaf inverting mechanism is always operative the member is fixed in position to be constantly active. This member is similar to the member 107 and has a downwardly inclined forward end 124, the words "forward end" being intended to indicate that end of the member 123 which first is engaged by the tray. The forward end 124 has an upper edge surface 125 which inclines upwardly and rearwardly from the extremity of the end 124. The surface 125 merges at its rear upper end into the forward end of a horizontal surface 126 forming the upper surface of the middle portion of the body of member 123. The surface 126 merges at its rear end into the forward end of a rearwardly extending and downwardly curved surface 127. On the side of the member nearer the middle of the leg 11 is a flange having its forward end 128 steeply inclined upwardly and rearwardly and merging smoothly through a curved portion into a horizontal portion 129 which merges in turn into a rearwardly extending and downwardly curved rear end portion 130. The flange portion 129 is spaced well back from the inclined end 128 and the upper faces of the flange portions 129 and 130 are lateral continuations of the surfaces 126 and 125. As before, when the tray 49a moves in the direction of the arrows in Figure 3 the pin 128 contacts the surface 127 and this retards and raises the bottom of the tray so that it begins to rotate in an anti-clockwise direction. This revolution continues until the tray is turned on its side so that substantially one-half of the tray projects below the chain and the remainder projects upwardly. Due to this position further travel of tray causes the end of the downwardly projecting portion to engage the flange 128 and the tray assumes the position shown in 49b. Still further movement of the conveyor causes the downwardly projecting portion to ride up over the flange portion 128 so that the tray is completely inverted and the end rests flat on the flange portion 129 as shown by the tray 49c. From here the tray passes over the curved flange portion 127, tilts further in an anti-clockwise direction and then swings into the normal depending position of tray 49d in passing around the drive wheels 20. Immediately below the position of the tray as it rides over the flange portion 128 is a receiving and guiding instrumentality 131. This device has a forward wall 132 fixed to a transverse frame member 133. This wall extends from a point just below the path of the bottoms of the trays 49 downwardly and rearwardly and terminates in upwardly spaced relation to the trays 49 carried by the conveyor stretch 26. Brackets 134 are secured to the fame 16 at the front and rear sides thereof and are positioned in rearwardly spaced relation to the wall 132. These brackets are provided with aligned bearing portions wherein is journalled a shaft 135. Brackets 136 are mounted in laterally spaced relation on the shaft 135. On the brackets 136 is fixed a rear wall which normally inclines downwardly and forwardly from the shaft 135 so that it slants in a direction opposite the forward wall 132, the structure thus including a pair of transversely extending synclinal walls, one of which is fixed and the other movable about an axis parallel to and adjacent its upper edge. Between the walls 132 and 137 are partitions 138 having anticlinal side faces so that the upper parts of these partitions are further apart than the lower parts and the partitions are fixed to the wall 132 and are free from the wall 137. These partitions equal in number the partitions 52 and end walls of each tray and are so spaced that they conform in spacing to the partitions 52. From an inspection of Figures 3 and 5 it wil be seen that this delayed shelf instrumentality is so located that the loaves dumped from the trays arriving at the position of tray 49b wil be received in the instrumentality 131 and the partitions 138 will effectually separate the loaves so that, in the further movement of these loaves, they will be properly spaced and the condition termed doubling wil be prevented. Fixed on the shaft 135 at the end opposite the location of the member 123 is an arm 139 which is located out of the path taken by the bodies of the trays 49. This arm extends at the same inclination as the wall 137 and lies in the path of the pivots 53. This arm has at its upper end a rearwardly extending horizontal portion 140 and this arm carries a counterweight 141 and the arm and counterweight serve to hold the wall 137 normally against the rear edges of the partitions 138. Referring especially to Figure 5 it will be there seen that the tray 49b has dumped its load, as diagrammatically indicated at 142, into the apparatus 13. At this time the pivot 53 of the tray 49c is riding on the extension 140 of the arm 139. Also the tray 49f is approaching a point at which it will be in position to receive loaves from the instrumentality 131. Continuation of the movement of the conveyor causes the pivot 53 of tray 49c to pass off the extension 140 and it is particularly to be noted that the dough loaves are held in apparatus 131 after dumping for a time sufficient to permit the movement of the pivot 53 above mentioned. The wall or shelf 137 is thus delayed in action until the extension 140 is free to swing upwardly about the axis of the shaft 135. As soon as this occurs the weight of the dough overcomes the action of the counterweight 141 and the wall or shelf 137 tilts downwardly allowing the dough to drop. Since the tray 49c has moved the tray 49f has also moved and at the instant of the freeing of the extension 140 the tray 49f wil be in position to receive the loaves released from the instrumentality 131. After the wall 137 has moved to release the dough and the latter has dropped, the counterweight 140 restores the wall to its normal position so that the next pivot 53 of tray 49b will lock the extension 140 against movement ready for the dumping of tray 49a, the operation being repeated for each tray.

The tray inverting and dumping mechanism 122 is preferably of the same type as that just described, being provided with an inverting member 142 and a delayed shelf instrumentality 143 so that the conveyor receives its load with the loaves in properly spaced relation to feed effectively to the moulder.

While one embodiment of the invention has been herein illustrated and described it is to be understood that this is but one of many embodiments of such invention. For instance, the leg may have a greater or less number of stretches of the main conveyor than the four here shown, the driving mechanism may differ from that shown and many other changes may be made in the form and proportions of the invention without departing from the essential principles involved. It is to be understood therefore that the invention is not to be limited to the specific embodiment herein set forth but is to be interpreted as of the full scope of the appended claims.

Having thus described the invention, what is claimed as new, is:

1. In a proofer having an elongated casing, and a conveyor travelling into and longitudinally of said casing, said conveyor entering the casing at one end thereof, a second conveyor extending transversely of the casing beneath the first conveyor adjacent its point of entry of the first conveyor into said casing, means for effecting discharge of the material carried by the first conveyor onto the second conveyor, said casing having a discharge opening below the first conveyor and adjacent the end of movement of said first conveyor through the casing, a third conveyor at said discharge opening and extending transversely beneath the first conveyor, and transfer means leading from the second conveyor to the third conveyor.

2. In a proofer, horizontal elongated casing having a conveyor inlet opening at one end, a conveyor extending longitudinally of the casing from said opening and including a series of spaced invertible dough trays, a second conveyor extending transversely through the casing below the first conveyor adjacent said inlet opening, a tray inverting mechanism positioned in said casing for successive engagement by said trays as they pass over the second conveyor, said casing having a discharge opening past which the first conveyor moves, a third conveyor extending transversely of the casing and below the first conveyor at said discharge opening, a tray inverting mechanism at said discharge opening for effecting discharge of the tray contents onto said third conveyor, and a chute positioned to receive dough from the second conveyor and discharge it onto the third conveyor.

3. In a proofer, horizontal elongated casing having a conveyor inlet opening at one end, a conveyor extending longitudinally of the casing from said opening and including a series of spaced invertible dough trays, a second conveyor extending transversely through the casing below the first conveyor adjacent said inlet opening, a tray inverting mechanism positioned in said casing for successive engagement by said trays as they pass over the second conveyor, dough guide means disposed above said second conveyor in position to receive dough from the inverted trays, said casing having a discharge opening past which the first conveyor moves, a third conveyor extending transversely of the casing and below the first conveyor at said discharge opening, a tray inverting mechanism at said discharge opening for effecting discharge of the tray contents onto said third conveyor, and a chute positioned to receive dough from the second conveyor and discharge it onto the third conveyor.

4. In a proofer, a conveyor including spaced and invertible dough trays, said conveyor having an upper stretch and a lower stretch parallel to the upper stretch, means to successively invert and dump the trays of the upper stretch, and means to receive and temporarily hold the dough dumped from said trays, said last means including a tiltable shelf for supporting dumped dough and having a tilt restraining element, said trays having means alternately engaging and releasing said restraining element as the trays pass above said tiltable shelf.

5. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, and coacting means associated with the conveyor and tiltable wall alternately holding the wall against tilting and releasing it for tilting, said coacting means including means on said trays and means on the tiltable wall wherewith the means on the trays cooperate as said trays pass over the tiltable wall.

6. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, and coacting means associated with the conveyor and tiltable wall alternately holding the wall against tilting and releasing it for tilting, said coacting means including means on said trays and means on the tiltable wall wherewith the means on the trays cooperate as said trays pass over the tiltable wall, said coacting means being constructed and arranged to release the tilting shelf in timed relation to the passage of a tray in said lower stretch to position to receive the dough released by said tilting wall.

7. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, and a counterweight associated with said tilting wall and normally holding it in dough receiving position.

8. In combination, a main conveyor, a pair of transverse conveyors extending below said main conveyor at spaced points in the length of the main conveyor, each of said transverse conveyors having a load receiving portion and a load discharging portion, means for effecting transfer of material from the discharge portion of one transverse conveyor to the receiving portion of the second conveyor, and means for causing discharge of material from the main conveyor selectively to the transverse conveyors.

9. In combination, a main conveyor, a pair of transverse conveyors extending below said main conveyor at spaced points in the length of the main conveyor, each of said transverse conveyors having a load receiving portion and a load discharging portion, means for effecting transfer of material from the discharge portion of one transverse conveyor to the receiving portion of the second conveyor, unloading means at each transverse conveyor for unloading the main conveyor onto each of the transverse conveyors, and means to render the unloading means at the first conveyor selectively operable and inoperable.

10. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, said coacting means being constructed and arranged to release the tilting shelf in timed relation to the passage of a tray in said lower stretch to position to receive the dough released by said tilting wall and a counterweight associated with said tilting wall and normally holding it in dough receiving position.

11. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, each tray being provided with spaced transverse compartment forming partitions, and partitions carried by the said fixed wall and spaced to conform to the spacing of the tray partitions.

12. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, said coacting means including means on said trays and means on the tiltable wall wherewith the means on the trays cooperate as said trays pass over the tiltable wall, said coacting means being constructed and arranged to release the tilting shelf in timed relation to the passage of a tray in said lower stretch to position to receive the dough released by said tilting wall, each tray being provided with spaced transverse compartment forming partitions, and partitions carried by the said fixed wall and spaced to conform to the spacing of the tray partitions.

13. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, a counterweight associated with said tilting wall and normally holding it in dough receiving position, each tray being provided with spaced transverse compartment forming partitions, and partitions carried by the said fixed wall and spaced to conform to the spacing of the tray partitions.

14. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, each tray being provided with spaced transverse compartment forming partitions, and partitions carried by the said fixed wall and spaced to conform to the spacing of the tray partitions, the partitions carried by said fixed wall having anticlinal side faces whereby the compartments formed thereby are longer at the top than at the bottom.

15. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rear walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, said coacting means including means on said trays and means on the tiltable wall wherewith the means on the trays cooperate as said trays pass over the tiltable wall, said coacting means being constructed and arranged to release the tilting shelf in timed relation to the passage of a tray in said lower stretch to position to receive the dough released by said tilting wall, each tray being provided with spaced transverse compartment forming partitions, and partitions carried by the said fixed wall and spaced to conform to the spacing of the tray partitions, the partitions carried by said fixed wall having anticlinal side faces whereby the compartments formed thereby are longer at the top than at the bottom.

16. In a proofer, a conveyor including spaced and invertible dough trays, said conveyor having an upper stretch and a lower stretch parallel to the upper stretch, means to successively invert and dump the trays of the upper stretch, means to receive and temporarily hold the dough dumped from said trays, said last means including a pair of synclinal forward and rearward walls extending transversely below the upper flight, one of said walls being fixed and the other wall being tiltable and constituting a delayed action shelf tending to tilt and release dough from said means, coacting means associated with the conveyor and tiltable wall alternately holding the wall against tilting and releasing it for tilting, a counterweight associated with said tilting wall and normally holding it in dough receiving position, each tray being provided with spaced transverse compartment forming partitions, and partitions carried by the said fixed wall and spaced to conform to the spacing of the tray partitions, the partitions carried by said fixed wall having anticlinal side faces whereby the compartments formed thereby are longer at the top than at the bottom.

BERNARD A. EVANS.